United States Patent [19]

Instance

[11] Patent Number: 4,560,432

[45] Date of Patent: Dec. 24, 1985

[54] APPARATUS FOR PRODUCING LABELS

[76] Inventor: David J. Instance, Past Heap Farm, Pembury, Tunbridge Wells, Kent, England

[21] Appl. No.: 657,167

[22] Filed: Oct. 3, 1984

Related U.S. Application Data

[62] Division of Ser. No. 506,807, Jun. 22, 1983, Pat. No. 4,488,922.

[30] Foreign Application Priority Data

Jun. 25, 1982 [GB] United Kingdom ................. 8218496

[51] Int. Cl.[4] .......................... B31F 1/00; B32B 31/00

[52] U.S. Cl. .................................... 156/459; 156/384; 156/387; 156/522; 156/552; 156/555; 156/571; 156/572; 156/578

[58] Field of Search ........................ 101/450.1; 283/81; 156/247, 268, 248, 277, 249, 301, 253, 302, 267, 387, 513, 571, 552, 572, 555, 578, 384, 522, 192, 459

[56] References Cited

U.S. PATENT DOCUMENTS

| | | | |
|---|---|---|---|
| 3,032,463 | 5/1962 | Morgan | 156/267 |
| 3,295,654 | 1/1967 | Clinton et al. | 156/277 |
| 3,580,791 | 5/1971 | Jordan | 156/249 |
| 3,869,328 | 3/1975 | Instance | 156/302 |

FOREIGN PATENT DOCUMENTS

| | | | |
|---|---|---|---|
| 1420933 | 1/1976 | United Kingdom | 156/302 |

*Primary Examiner*—John J. Gallagher
*Attorney, Agent, or Firm*—Burns, Doane, Swecker & Mathis

[57] ABSTRACT

An apparatus for producing a succession of lithographically-printed self-adhesive labels on a length of release backing material. A plurality of sheets carrying a desired image are lithographically produced. Each of the lithographically-printed sheets is successively adhered to a support web comprising a self-adhesive backed material carried on a release material. The printed sheets are adhered to the upper surface of the adhesive backed material. A cutter cuts through the adhered lithographic sheets and through the adhesive-backed material as far as the release material to form the required labels. A removal device removes the unwanted portions of the printed sheets and the adhesive-backed material adhered thereto from the release material.

9 Claims, 3 Drawing Figures

APPARATUS FOR PRODUCING LABELS

This application is a division, of application Ser. No. 06/506,807, filed June 22, 1983, now U.S. Pat. No. 4,488,922.

BACKGROUND AND OBJECTS OF THE INVENTION

The presnet invention relates to a method and apparatus for producing labels, more particularly to a method and apparatus for producing self-adhering lithographically printed labels.

In the packaging field there is a great demand for high quality pre-printed labels for labelling containers of various types. In order to facilitate the packaging and labelling of containers at a fast rate it is generally required that the labels to be attached to the containers be made available in a form in which they are easy to handle and easy to transfer onto the containers for which they are intended. In one convenient arrangement the labels are self-adhesive labels which are carried in series on a web of release material which is wound into a reel.

It is well known in the art to produce reels of self-adhesive labels carried on a release paper for transfer of the labels from the release paper to a container to be labelled.

One process for producing such labels is described in my company's U.S. Pat. No. 3,869,328. This patent describes a process for the production of a continuous reel of self-adhesive labels, wherein the labels are produced as separate flat sheets cut to finished size and stacked, the separate labels are then fed in succession from the stack onto the periphery of a drum and held thereon by vacuum means while being fed to an applicator by which they are coated individually on their reverse sides with a pressure-sensitive adhesive composition, the adhesive is dried by passing the labels through a hot air chamber extending around a substantial part of the periphery of the drum, and the labels are applied successively by their adhesive coated sides to a continuous web of release paper which moves against said drum and which is then reeled.

However this process has certain disadvantages in that it is difficult to produce a continuous reel of self-adhesive labels in which there is a regular gap between adjacent labels. Generally it is preferred to have a regular gap for ease of application of the labels to containers in a continuous labelling process. The reason for this difficulty is that it is not readily possible to place each successive label accurately onto the periphery of the rotating drum and then subsequently to transfer the labels accurately from the drum to the moving web of release paper to obtain a regular spacing between adjacent labels on the release paper. In addition, accurate alignment of the labels on the release paper can be difficult to achieve because of the difficulties mentioned above which are encountered when transferring the labels from the stack of labels to the release paper. This can result in some of the labels being skew relative to other labels on the reel of release paper. When the labels are subsequently applied to containers from the reel, any labels which are in a skew position on the reel of release paper are inevitably transferred in an out-of-true condition and are therefore mis-aligned on the container to which they are attached. This is unacceptable as it renders the product so labelled unattractive to the consumer.

A further disadvantage of this process is that after coating the reverse sides of the labels with pressure-sensitive adhesive, drying the adhesive and applying the labels by their adhesive coated sides to the continuous web of release paper, one frequently obtains surplus adhesive appearing around the periphery of the labels on the release paper. When the release paper is wound into a reel this surplus adhesive adheres to the back of the adjacent layer of release paper and can subsequently interfere with the unwinding of the reel and the application of the labels to containers to be labelled.

The present invention aims to overcome these disadvantages by arranging for the peripheral portions of labels applied to a support web to be removed after the labels have been applied to the support web and before the labels are wound into a reel.

As far as I am aware, in the past the printed matter carried on labels which are in the form of a continuous reel of self-adhesive labels is usually printed on to the labels in a continuous manner by means of flexographic, silk-screen, gravure or letterpress printing methods. However, all these printing methods have certain disadvantages when preparing printed labels carried in series on a support web intended to be wound into a reel. In particular, it is not possible to produce high quality multi-coloured images with screen-printing, flexographic, or letterpress printing techniques. The very nature of these printing techniques prevents them from being used to print fine screens. Furthermore, printing machines built to process labels on the reel are, of necessity, complicated and expensive to produce.

In addition very fine print cannot easily be reproduced if flexographic or screen printing techniques are used.

As a result of these various disadvantages, it has previously been difficult to obtain labels for containers having high quality print and showing multi-coloured images of high quality, except for labels printed by gravure techniques. However, owing to the high tooling costs associated with gravure printing, the use of gravure printing is limited to long printing runs.

Lithographically printed images do not suffer from the disadvantages of printed images prepared by the methods discussed above. The use of lithographically-printed images for the preparation of labels in reel form has, as far as I am aware, never been undertaken on a commercial scale, the main reason being that the printing cylinders used have to be specifically made for each different repeat length of label required. I believe that the problems associated with using lithographic printing processes have only been overcome on prototype equipment which lifts the printing cylinder and stops the web prior to each subsequent printing step.

SUMMARY OF THE INVENTION

It is a further aim of the present invention to provide an economic and efficient method of producing lithographically printed labels for continuous application to containers to be labelled.

According to the present invention there is provided apparatus for producing a succession of lithographically-printed self-adhesive labels on a length of release backing material, which apparatus comprises means for transferring individual lithographically-printed sheets in succession from a stack of such sheets to a support web, the support web comprising a self-adhesive backed material carried on a release backing material, means for adhering the lithographically-printed sheets to the support web, a cutting device for cutting the adhered lithographic sheets and the self-adhesive backed material to form the required labels on the length of release backing material, and means for removing the unwanted portions of the printed sheets and adhesive-backed material adhered thereto.

Preferably the apparatus includes means for winding the length of release backing material and the labels formed thereon onto a reel.

In one embodiment of the apparatus the means for adhering the lithographically-printed sheets to the support web comprises an applicator for applying adhesive to the upper surface of the support web upstream of the zone at which the printed sheets are brought into contact with the support web, and pressure means located downstream of said zone for urging the printed sheets against the support web.

In an alternative arrangement, the adhesive may be applied to the rear face of each of the lithographically-printed sheets prior to their adhesion to the support web.

In a further embodiment, the means for adhering the lithographically-printed sheets to the support web comprises coating means for applying a heat-sealable lacquer either to the upper surface of the support web or to the rear face of each label, said coating means being located upstream of the zone at which the printed sheets are brought into contact with the support web, and heated pressure means located downstream of said zone for urging the printed sheets against the support web and curing the heat-sealable lacquer. Preferably, the heated pressure means comprises one or more pairs of heated rollers.

THE DRAWINGS present invention will now be illustrated, by way of example only, with reference to the accompanying drawings, in which:

FIG. 1 shows a diagram of one embodiment of an apparatus in accordance with the invention, and FIGS. 2 and 3 show diagrams of alternative embodiments of an apparatus in accordance with the present invention.

DETAILED DESCRIPTION OF A PREFERRED EMBODIMENT OF THE INVENTION

Figure 1:
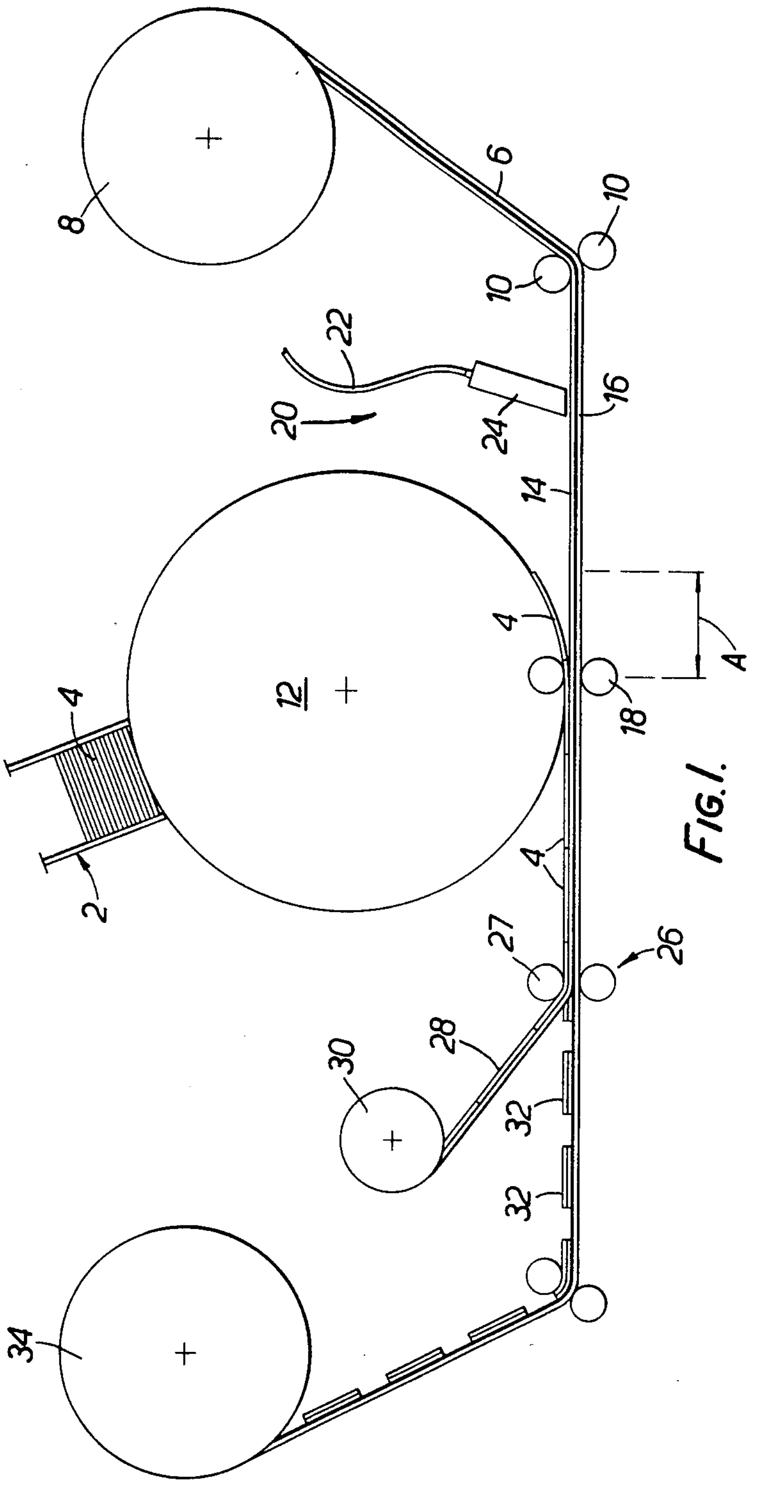

Referring to the drawing, there is shown an apparatus for preparing a reel carrying a succession of lithographically-printed labels, the apparatus comprising a stack 2 of lithographically-printed sheets 4, printed by conventional lithographic techniques, and which are arranged to be fed individually and successively to a support web 6 unwound under slight tension from a reel 8 via guiding rollers 10. The support web 6 which is used is a double-layered material consisting of an adhesive-backed paper 14 with the adhesive side of the paper being protected by a release backing material 16 such as silicone-faced backing paper. Such support webs are commonly referred to as self-adhesive stock or pressure-sensitive stock. The individual lithographically-printed sheets are adhered to the upper surface of the adhesive-backed layer of the support web 6 by coating the upper surface of the support web with a suitable adhesive, such as PVA (polyvinyl alcohol) adhesive, and then applying each printed sheet in turn to the upper surface of the support web whereupon the resultant composite is passed through nip rollers 18 which ensure complete adhesion of the lithographically-printed sheets 4 to the support web 6. The adhesive is applied to the support web at a coating station 20 upstream of zone A at which the sheets are brought into contact with the support web. At the coating station adhesive is supplied from a reservoir (not shown) via a conduit 22 to an applicator 24 from which adhesive is expressed on to the upper surface of the support web 6.

In an alternative embodiment instead of applying adhesive to the upper surface of the support web, the adhesive is applied to the rear face of each printed sheet before the sheets are applied to the support web.

After a first sheet has been adhered to the support web, a subsequent sheet is brought into position on the support web immediately behind the first sheet and adhered to the support web in the manner described above. The sheets are transferred individually from the stack 2 of sheets to the support web by suitable transfer means 12. In a preferred arrangement the transfer means includes rotary indexable arms carrying vacuum-actuated suction pads for holding and releasing the printed sheets to be transferred from the stack 2 of sheets to the support web. The support web 6 and the transfer means 12 are arranged so that their relative movement can be adjusted to produce a gap between adjacent sheets, or to produce an overlap between adjacent sheets, or to ensure that adjacent sheets abut.

After passing through the nip rollers 18, the support web 6 and the succession of sheets adhered thereto are conveyed to a die-cutting station 26 where a die cutting roller 27 is arranged to cut through the lithographically printed sheets 4 and through the adhesive-backed layer 14 of the support web 6 to which said sheets have been adhered, but not through the release backing material 16 of the support web 6. Different die-cutters 27 may be used to produce labels of different shapes and sizes.

After the required shape has been cut into the said layers of material, the waste portions 28 of the said layers are removed from the release backing material 16 and taken up on a reel 30 while the labels 32 thus produced remain on the release backing material and are wound up into the form of a reel 34 for subsequent removal from the backing material and application to a container to be labelled.

In an alternative arrangement, a heat-sealable lacquer may be used to adhere the lithographically-printed sheets to the support web by applying through coating means the said lacquer either to the upper surface of the support web or to the rear face of each printed sheet, the coating means being located upstream of the zone A at which the printed sheets are brought into contact with the support web, and the heat-sealable lacquer is subsequently cured by passing the resultant assembly of printed sheets and support web through heated pressure means such as heated rollers which are located downstream of zone A.

Figure 2:
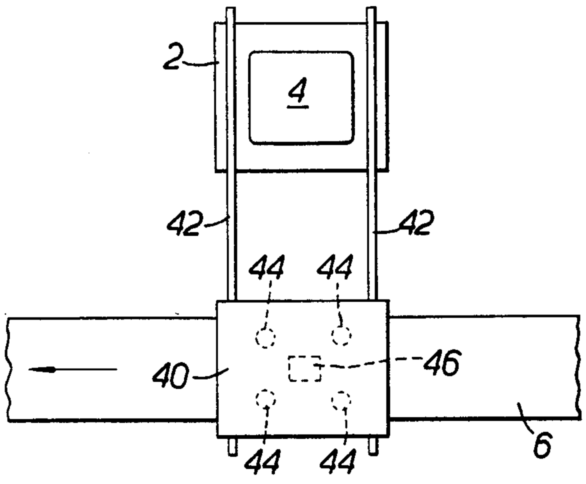

Instead of the transfer means 12 of FIG. 1, it may be preferable as shown in FIG. 2 to locate the stack 2 of lithographically printed sheets 4 alongside the pathway travelled by the support web 6 and to use alternative means to transfer sheets from this stack 2 to the support web 6. A suitable transfer means comprises a carriage 40 which can reciprocably travel on rails 42 from a position above the stack 2 of printed sheets to a position above the support web 6. The carriage is provided with vacuum-actuated suction pads 44 for gripping the printed sheets and a centrally located solenoid-controlled rod 46 which is arranged to urge the printed sheet downwardly onto the support web 6 when the sheet is released from the said suction pads. In use the carriage 40 with the rod 46 in a retracted position travels into a position over the stack 2 of printed sheets and by activation of the suction pads 44 picks up the top sheet in the stack. The carriage then conveys the said sheet into position over the support web whereupon the vacuum controlling the suction pads is released and at the same time the rod 46 is activated to urge the printed sheet down into contact with the support web. The rod 46 is then retracted and the carriage returned to its initial position above the stack 2, and the sequence of operations is then repeated to transfer each printed sheet in turn from the stack to the support web.

Figure 3:
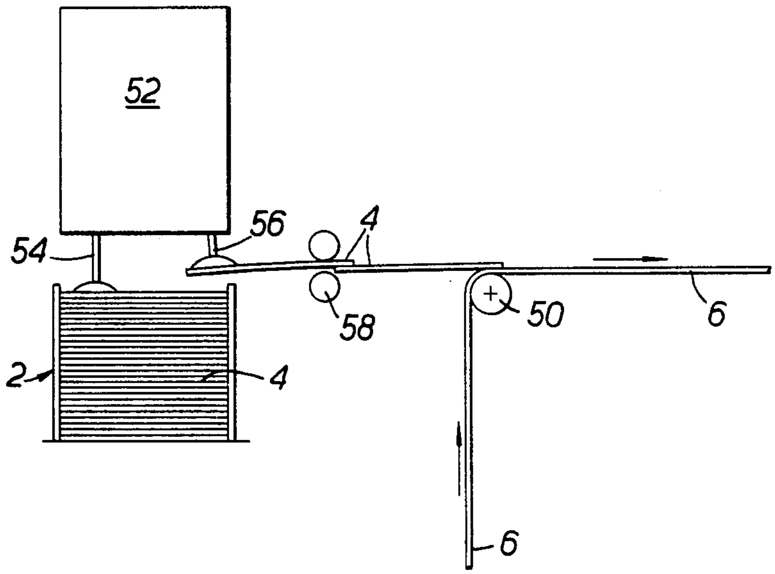

A still further alternative arrangement for transferring printed sheets to the support web is illustrated diagrammatically in FIG. 3. This shows an arrangement in which the support web is caused to travel upwardly over a roller 50 and then to travel in a horizontal direction. Printed sheets 4 are transferred from a stack 2 onto the moving support web as the support web passes over roller 50 by means of a stream feeder 52 of known construction. Stream feeders are known in the art and will therefore not be described in detail. However, they include a first series of vacuum-operated suction pads 54 which are arranged to reciprocate in a vertical direction for lifting a top sheet from a stack of such sheets and a second series of vacuum-operated suction pads 56 which co-operate with the first series of suction pads 54 and reciprocate in a for-and-aft direction to transfer a sheet from the first suction pads 54 to rollers 58 which in turn feed the sheets to the support web 6 as it passes over the roller 50. When using this arrangement incorporating a stream feeder, if an adhesive is to be used to adhere the printed sheets to the support web 6 the adhesive must be applied not to be rear face of the printed sheets, but to the upper surface of the support web, and must be applied to the support web at a location upstream of the roller 50.

It will be appreciated that the present invention provides means of obtaining in economic manner high quality lithographically-printed labels in a form highly suited for efficient use in the packaging field for easy application to containers which are to be labelled.

What is claimed is:

1. Apparatus for producing a succession of lithographically-printed self-adhesive labels on a length of release backing material, which apparatus comprises means for transferring individual lithographically-printed sheets in succession from a stack of such sheets to a support web, the support web comprising a self-adhesive backed material carried on a release backing material, means for adhering the lithographically-printed sheets to the support web, a cutting device for cutting the adhered lithographic sheets and the self-adhesive backed material to form the required labels on the length of release backing material, and means for removing the unwanted portions of the printed sheets and adhesive-backed material adhered thereto.

2. Apparatus according to claim 1, further including means for winding the length of release backing material and the labels formed thereon onto a reel.

3. Apparatus according to claim 1, wherein the means for adhering the lithographically-printed sheets to the support web comprises an applicator for applying adhesive to the upper surface of the support web upstream of the zone at which the printed sheets are brought into contact with the support web, and pressure means located downstream of said zone for urging the printed sheets against the support web.

4. Apparatus according to claim 1, wherein the means for adhering the lithographically-printed sheets to the support web comprises an applicator for applying adhesive to the rear face of each of the said sheets upstream of the zone at which the printed sheets are brought into contact with the support web, and pressure means located downstream of said zone for urging the printed sheets against the support web.

5. Apparatus according to claim 1, wherein the means for adhering the lithographically-printed sheets to the support web comprises coating means for applying a heat-sealable lacquer either to the upper surface of the support web or to the rear face of each label, said coating means being located upstream of the zone at which the printed sheets are brought into contact with the support web, and heated pressure means located downstream of said zone for urging the printed sheets against the support web and curing the heat-sealable lacquer.

6. Apparatus according to claim 5, wherein the heated pressure means comprises one or more pairs of heated rollers.

7. Apparatus according to claim 1, wherein the transfer means includes rotary indexable arms carrying vacuum-actuated suction pads for holding and releasing the printed sheets to be transferred from the stack of sheets to the support web.

8. Apparatus according to claim 1, wherein the transfer means comprises a carriage which can reciprocably travel from a position above the stack of printed sheets to a position above the support web, the carriage being provided with vacuum-actuated suction pads for gripping a printed sheet and a centrally located solenoid-controlled rod which is arranged to urge a printed sheet downwardly onto the support web when the sheet is released from the said suction pads.

9. Apparatus according to claim 1, wherein the transfer means comprises a stream feeder for transferring printed sheets from a stack of sheets to the support web.

* * * * *